United States Patent [19]

Stuermer et al.

[11] 4,344,677

[45] Aug. 17, 1982

[54] LASER PRINTER WITH MULTIPLE SCANNING BEAMS

[75] Inventors: Paul A. Stuermer; Richard N. Blazey, both of Rochester, N.Y.

[73] Assignee: Eastman Kodak Company, Rochester, N.Y.

[21] Appl. No.: 301,705

[22] Filed: Apr. 14, 1981

Related U.S. Application Data

[63] Continuation of Ser. No. 70,230, Aug. 27, 1979, abandoned.

[51] Int. Cl.$^3$ ............... G06K 15/12; H04N 1/22
[52] U.S. Cl. ............................... 354/5; 346/108; 358/302
[58] Field of Search ............ 354/5, 7; 346/76 L, 346/108; 350/6.5–6.91, 358; 358/285, 293, 300, 302; 365/120, 123

[56] References Cited

U.S. PATENT DOCUMENTS

| | | | |
|---|---|---|---|
| 3,055,258 | 9/1962 | Hurvitz | 350/358 X |
| 3,744,039 | 7/1973 | Hrbek et al. | 340/173 LM |
| 3,997,722 | 12/1976 | Bardos | 358/285 |
| 4,044,363 | 8/1977 | Morgan | 354/5 |
| 4,089,008 | 5/1978 | Suga et al. | 354/5 |

Primary Examiner—John Gonzales
Attorney, Agent, or Firm—John D. Husser

[57] ABSTRACT

Disclosed herein is a laser printer for printing alphanumeric characters and the like on a photosensitive surface. An acoustooptic cell, in cooperation with its driving circuitry, serves to diffract an incident laser beam to produce two or more first-order diffracted beams, and to deflect such beams in a common plane through discrete angular ranges to produce tandem scan lines on a photosensitive surface. A data source, such as a character generator or programmed computer, is used to modulate the intensity of each of the diffracted beams independently so that the tandem scan lines collectively define a full column (or row) of picture elements of information to be printed.

7 Claims, 6 Drawing Figures

LASER PRINTER WITH MULTIPLE SCANNING BEAMS

CROSS-REFERENCE TO RELATED APPLICATIONS

This is a continuation of application Ser. No. 70,230, filed Aug. 27, 1979, now abandoned.

Reference is hereby made to a patent application Ser. No. 70,231 filed concurrently herewith in the names of R. A. Spaulding and R. N. Blazey, entitled "Laser Printer," now abandoned.

BACKGROUND OF THE INVENTION

This invention relates to improvements in laser printers of the type which print alphanumeric characters, forms, logos, etc. by rapidly deflecting a laser beam to produce a scan pattern on a photosensitive surface.

In U.S. Pat. No. 4,044,363 issued to G. T. Morgan, there is disclosed a photocomposition system in which an intensity-modulated continuous-wave laser is deflected in mutually perpendicular directions to print lines of alphanumeric characters on a photosensitive surface. In the Morgan system, an entire line of characters is printed during each horizontal scan of the laser beam. This result is achieved by rapidly deflecting the beam upwardly and downwardly while steadily deflecting the beam, at a relatively slow rate, horizontally. During each vertical deflection of the laser beam, one column of picture elements, commonly referred to as "pixels," of the character is printed. After several columns of pixels have been formed in this manner, the entire character is printed. A programmed computer is used to control blanking of the beam as it moves vertically in order to print the desired characters.

In the Morgan system, the rapid vertical movements of the laser beam is accomplished acoustooptically by passing the laser beam through a conventional acoustooptic cell while simultaneously varying the frequency of the acoustic wave travelling therein. Since the angle at which the acoustooptic cell diffracts an incoming beam of radiation is dependent upon the instantaneous frequency of the acoustic wave travelling in the cell, the direction in which the diffracted beam emerges from the cell can be precisely controlled by precisely controlling the acoustic frequency. Control of the acoustic frequency is effected by driving the cell's transducer with a voltage-controlled oscillator (VCO) and using a signal generator to periodically sweep the output frequency of the VCO through a predetermined frequency range. As the frequency of the VCO output increases, the angle at which the cell diffracts the laser beam increases.

In the Morgan system, as in all laser printing systems in which a beam of radiation is acoustooptically deflected to produce a raster scan, the maximum printing speed is limited by the rate at which the acoustooptic device is capable of deflecting the beam through the requisite scan angle. In systems of the type described above, this rate is determined by the tuning rate of the voltage-controlled oscillator which, in turn, depends upon the frequency response of its input circuits. The maximum linear tuning rate of conventional voltage-controlled oscillators is about 5 MHz per microsecond. This means that the maximum printing speed of such systems is limited to approximately 1000 lines per minute, or approximately 1500 characters per second.

SUMMARY OF THE INVENTION

In view of the foregoing, it is the primary objective of this invention to provide an apparatus and method for increasing the printing speed of laser printers of the type which employ acoustooptic devices, or equivalent devices (e.g. electrooptic devices), for rapidly deflecting a laser beam to produce scan lines on a photosensitive surface.

According to a preferred method of the invention, the above objective is achieved by acoustooptically diffracting a laser beam in such a manner as to produce a plurality of spatially separated, first-order diffracted beams, and simultaneously deflecting each of the diffracted beams through contiguous angular ranges. Upon striking a photosensitive surface, the deflected beams produce tandem scan lines thereon each of the tandem lines terminating at the point at which an adjacent tandem line starts. Prior to striking the photosensitive surface, the intensity of each of the deflected beams is independently modulated by a data source (e.g. a character generator or programmed computer) so that the tandem scan lines, when produced, collectively display the information to be printed.

Inasmuch as the method of the invention produces one complete scan line of a raster pattern at the speed at which it produces each of the shorter tandem scan lines, the printing speed, relative to that of conventional methods, is a multiple of the number of tandem scan lines which make up one complete scan line of the raster pattern.

Preferred apparatus for producing the above-mentioned tandem scan lines takes the form of an acoustooptic cell and circuit means for propagating therein a complex acoustic wave having at least two frequency components which vary periodically and concurrently within different, substantially non-overlapping frequency ranges. Preferred apparatus for propagating such a complex acoustic wave comprises a plurality of variable frequency oscillators (the number of oscillators being equal to the desired number of frequency components), and means for sweeping the output frequency of each oscillator through different and non-overlapping frequency ranges which are contiguously arranged in the frequency spectrum. Means are provided for driving the electromechanical transducer element of the acoustooptic cell with the combined outputs of the oscillators. The effect of the complex acoustic wave travelling in the acoustooptic cell is to simultaneously diffract an incident laser beam to produce a plurality of co-planar first-order beams (corresponding in number to the number of frequency components in the acoustic wave) and to repetitively deflect each of the diffracted beams through different, non-overlapping angular ranges, one angular range terminating substantially at an angle at which an adjacent angular range starts. Each of the deflected beams, when used to expose a photosensitive surface, produces one of the aforementioned tandem scan lines. Means are provided for modulating the intensity of each of the first-order beams independently, each beam being intensity-modulated in accordance with a different portion of the data to be recorded. Collectively, therefore, the beams imagewise expose the photosensitive surface to the information to be recorded.

Since the number of tandem scan lines is determined by the number of variable frequency oscillators used to drive the acoustooptic cell's transducer, it is possible to double, triple, quadruple, etc., (depending on the number of variable frequency oscillators used) the printing speed of a conventional laser printer which uses only single variable frequency oscillator to acoustooptically deflect a laser beam.

Additional objectives and advantages of the present invention will be apparent to those skilled in the art from the ensuing detailed description of the preferred embodiment, reference being made to the accompanying drawings.

DETAILED DESCRIPTION OF A PREFERRED EMBODIMENT

Figure 1:
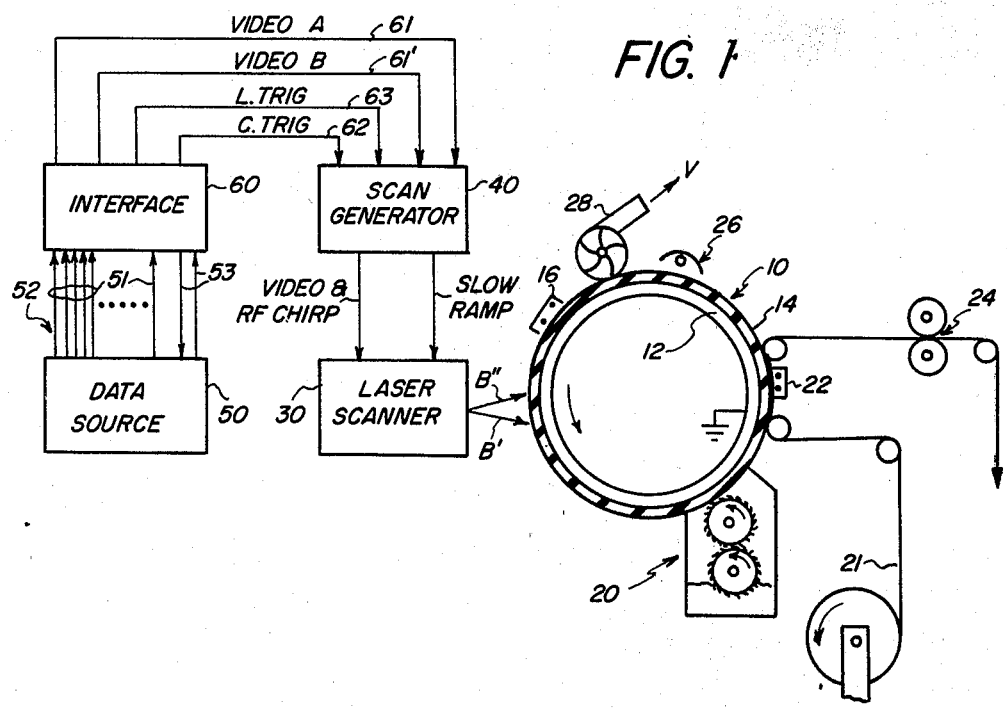
FIG. 1 is a schematic illustration of an electrophotographic laser printer embodying the invention.

Referring now to the drawings, FIG. 1 schematically illustrates a laser printer in which images of alphanumeric characters, forms, logos and the like are formed on the photosensitive surface of a cylindrical recording element 10. In this case, the recording element is of the type used in conventional electrophotographic recorders, comprising an electrically grounded cylindrical drum 12 which supports a photoconductive layer 14. Means, not shown, are provided for rotating the recording element at a constant speed in the direction of the arrow.

Transferrable toner images are formed on the photoconductive surface of recording element 10 by the basic electrophotographic recording process. While this process is well known, it is useful to summarize it as follows: First, electrostatic images are formed on the photoconductive layer of the recording element by applying a uniform electrostatic charge to the photoconductive surface at a charging station 16, and then imagewise exposing the uniformly charged surface to actinic radiation at an exposure station 18. The exposure step serves to selectively dissipate the uniform charge, leaving behind a latent electrostatic image which is a mirror image of the information to be printed. This latent image is then rendered visible, at a developing station 20 by applying electroscopic toner particles thereto. Preferably, the electrophotographic process is carried out in the so-called "neg-pos" mode (sometimes known as the "reversal" mode) so that the toner particles are applied only to those areas of the photoconductive recording element that have been illuminated by the actinic radiation. This involves electrically biasing the developing station 20 to the same polarity as that of the charge deposited by the charging station 16, and adjusting the bias level of the development station so that it approximates the level of charge on the unexposed portions of the photoconductive surface. Operating in the neg-pos mode allows the scanning laser beam (discussed below) to print "bright" characters. Moreover, the neg-pos mode obviates the need for exactly matching the bottom of one scan line to the top of the next since unexposed and, hence, undevelopable, space fills between the scan lines. A photoconductive material which is particularly well adapted for use in the neg-pos mode is disclosed in the commonly assigned U.S. Pat. No. 3,873,311, the disclosure thereof being incorporated herein by reference.

Upon developing the latent electrostatic images on the recording element, the developed images are transferred to a receiving member 21, such as plain paper support, at a transfer station 22. Thereafter, the transferred toner images, which are now right-reading, are bonded to the receiving member at a fusing station 24 via the application of heat and pressure. After transferring the toner images to the receiving member, the photoconductive surface of the recording element is uniformly illuminated by a lamp 26 to dissipate electrostatic charges which may attract residual toner particles to the surface. The residual toner is then removed by a rotating brush 28 to which a vacuum V is applied. In this manner, the recording element is readied for another cycle of operation.

Figure 6:
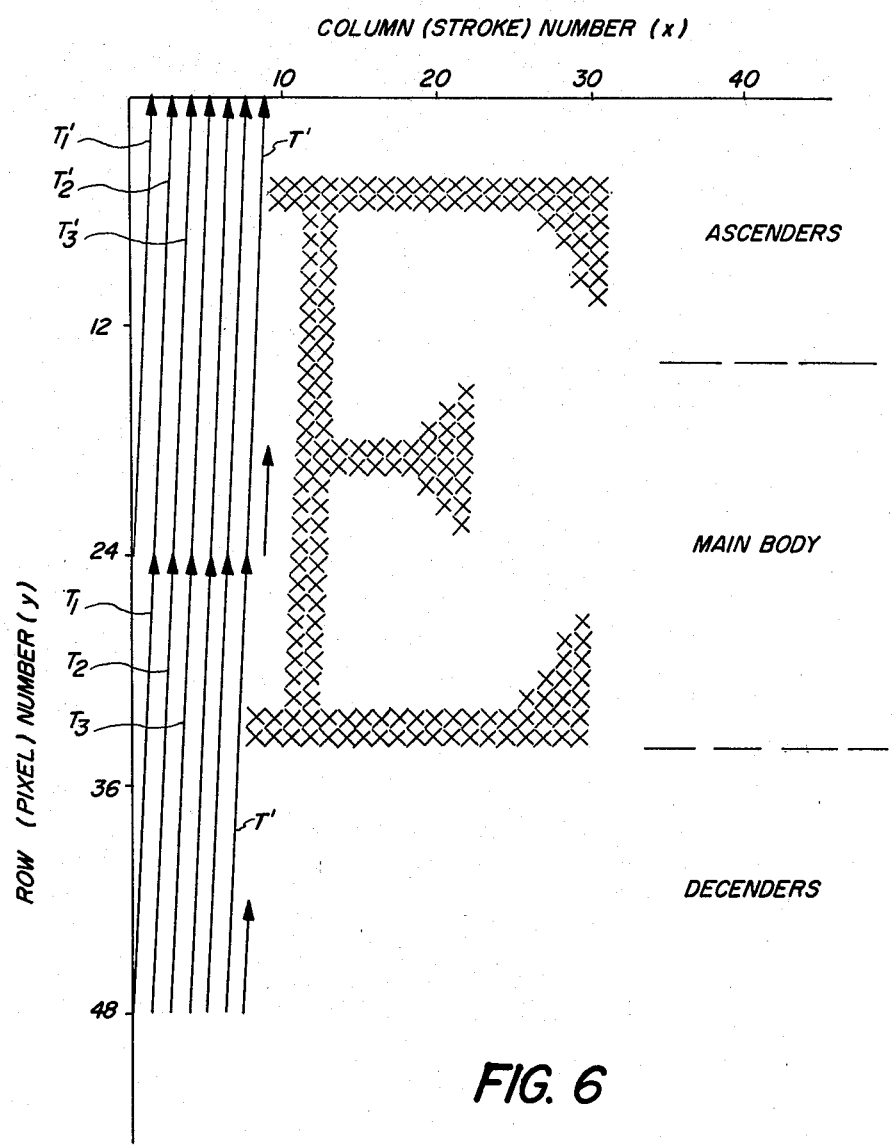
FIG. 6 illustrates a preferred scan raster provided by the laser printer of the invention.

Now, in accordance with a preferred embodiment of the invention, imagewise exposure of the photoconductive recording element 10 is effected by two intensity-modulated laser beams B' and B" which, by means of a laser scanner 30, are simultaneously scanned across the recording element's photosensitive surface to produce a pair of tandem scan lines, T and T' (see FIG. 6). The scan lines are "tandem" in the sense that one line (T') starts precisely at the point at which the other line (T) stops; they are not, however, produced simultaneously, as explained below. The respective positions at which the laser beams strike the photosensitive surface are controlled by electrical signals supplied to the laser scanner by a scan generator 40. The respective intensities of the scanned laser beams are controlled by the output of a data source 50 (e.g. a character generator or a programmed computer) which, via interface 60, provides a pair of video signals, 61', indicative of the information to be recorded to scan generator 40. Preferably, an entire line of alphanumeric characters is imaged on the recording element during each horizontal sweep of the beams (i.e., a sweep parallel to the axis of rotation of the recording element) by rapidly and repetitively deflecting the laser beams vertically through a small angular range while simultaneously deflecting the beams horizontally at a substantially slower rate. This type of scan pattern is shown in FIG. 6. During each upward stroke of the laser beams, one vertical column of the picture elements (i.e. "pixels") of a desired character or the like is imaged on the recording element. After many (e.g. 20 to 30) columns of pixels have been formed in this manner, the entire character is imaged.

As may be best appreciated by referring to FIG. 6, each character (or incremental area of a form, picture, logo, etc.) to be printed is represented by a unique arrangement of "on" and "off" pixels arranged in an x-y matrix. According to the preferred embodiment, each character is composed of 48 horizontal rows (y) and a variable number of columns (x), depending on the width of each character. Three or four rows at the top and bottom of the matrix are reserved for the spacing between adjacent lines of characters. Approximately twelve rows between the main body portion of the characters and the top and bottom margins are used to print characters having ascenders (e.g. upper-case letters and certain lower-case letters, for example, h, k and b) and descenders (e.g. lower case q, p and g). Each pixel location has a unique pair of locators (x, y). A set of values A(x,y) is stored in a computer memory which comprises data source 50 for each of k characters. $A_k(x,y)$ is 0 when the pixel is "off" and 1 when the pixel is "on." The complete set of alphanumeric characters, special symbols, forms, and any other sampled information (e.g., pictures and personal signatures) which is stored in the computer memory is called a font set. Generally, when a specific character, symbol, etc. of the font set, is to be printed, the appropriate character matrix $A_k$, is selected and sent over a multiline data link 52 to an interface 60 which converts the electronic input to video signals 61 and 61' which are useful for controlling scan generator 40. For details, reference is made to the aforementioned U.S. Pat. No. 4,044,363 to Morgan.

Still referring to FIG. 6, it will be appreciated that each of the scan lines T and T' is slanted. This slanting of the scan lines, of course, stems from the fact that the beams B' and B" are being scanned horizontally and vertically at the same time. As a result of this slanting, the first scan line $T_1'$, (produced by beam B") is not, in fact, "tandem" with the first scan line $T_1$ (produced by beam B'). Rather, scan line $T_2'$ is tandem with line $T_1$, which is produced one column period later. Thus, at the start of each line of characters, the $T_1'$ scan line will always comprise a column of "off" pixels, and the pixel information for beam B" must be delayed in time by one column period with respect to beam B". This delay is effected in a conventional manner by the data source 50.

Figure 2:
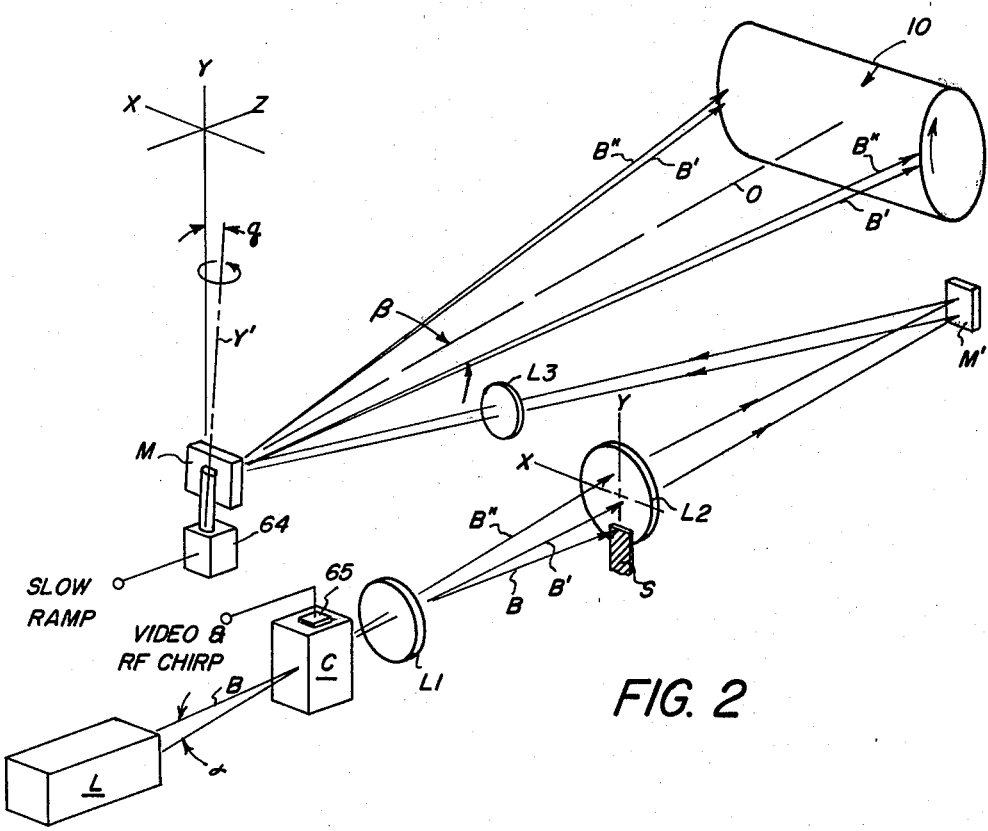
FIG. 2 is a perspective view of the optical elements comprising the laser scanner component of the FIG. 1 printer.
Figure 3:
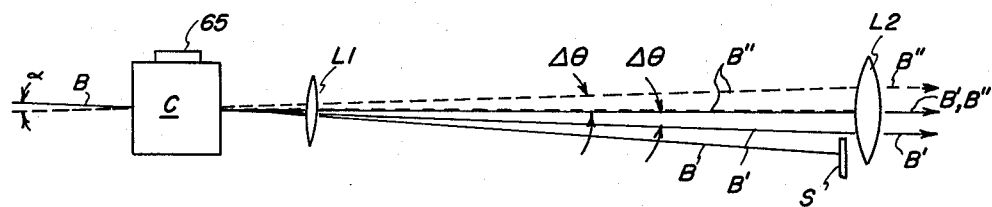
FIG. 3 is an enlarged optical diagram of certain optical elements of the laser scanner component of the FIG. 1 printer.

In FIGS. 2 and 3, preferred optical elements of laser scanner 30 are shown schematically. This particular type of laser scanner is optically simple, comprising only a continuous-wave laser L, a single acoustooptic cell C, three lens, L1, L2, L3, and a moving mirror M. A stationary mirror M' serves merely to fold the optical system. Briefly, laser L provides the actinic radiation for exposing the photoconductive recording element 10. Acoustooptic cell C, together with its driving circuitry (described below), functions (a) to diffract the laser beam B to produce a pair of diffracted beams B' and B", (b) to rapidly and repetitively deflect beams B' and B" in a vertical plane, through small angular ranges $\Delta\theta$ and $\Delta\theta'$, respectively, and (c) to modulate the respective intensities of beams B' and B" independently, in accordance with information to be recorded. Lenses L1, L2 and L3 serve to image beams B' and B" on the recording element to produce the tandem scan lines T and T' shown in FIG. 6. Together, the tandem scan lines define a vertical column of pixels of a desired character. Moving mirror M serves to deflect the intensity-modulated and vertically-deflected beams B' and B" in the horizontal direction to produce a two dimensional scan raster on the recording element.

Laser L may comprise any continuous-wave source of coherent, substantially monochromatic radiation to which the photoconductive layer 14 of recording element 10 is sensitive. However, when only a single acoustooptic cell is used to both intensity-modulate and angularly deflect the scanning laser beams, it is important, in order to optimize the printing speed, that the diameter of the laser beam entering the acoustooptic cell be small enough to be intensity-modulated at a relatively fast rate, yet be large enough to be focused by the lens elements to a relatively small spot size. (A more detailed discussion of the beam criterion is provided in the aforereferenced U.S. application Ser. No. 70,231).

Moreover, to prevent density variations in the printed characters, the laser power in each of the diffracted beams B' and B" should be sufficient to saturate the photoconductive layer of the recording element (i.e. totally discharge the exposed areas) regardless of the position at which the laser beams strike the photoconductive surface. Since the intensity of a beam diffracted by an acoustooptic cell is a function of the diffraction angle $\theta$, each of the diffracted beams will vary in intensity along the vertical column of picture elements, e.g. be more intense at the center of its scan than at the beginning or end. Depending on the characteristics of the acoustooptic cell, the intensity of the diffracted beam can vary by as much as 50% through a deflection angle of only one or two degrees. Intensity levelling can be achieved, without sacrificing image resolution, by operating the laser at a power sufficient to produce photoconductor saturation.

As regards the acoustooptic cell C, this element, as mentioned above, cooperates with driving circuitry to provide the dual function of repetitively deflecting the diffracted beams in the vertical or Y direction through their respective angular ranges $\Delta\theta$ and $\Delta\theta'$, and of selectively blanking these beams so as to provide a vertical column of pixels of a selected character. Basically, the cell comprises an acoustooptic medium 64, such as glass, crystal or plastic, to which an electromechanical transducer 65 (e.g. a piezoelectric quartz crystal) is acoustically coupled. Transducer 65 is responsive to an electrical signal applied thereto to propagate a complex acoustic wave within the acoustooptic medium, such wave having frequency components and an amplitude corresponding to the same parameters of the applied signal. The acoustic wave in the cell acts to diffract a portion of the incident laser beam B, incident at the Bragg angle $\alpha$, to form a first-order diffracted beams B' and B". The respective diffraction angles at which the diffracted beams B' and B" emerge from the cell are determined by the instantaneous frequency components of the acoustic wave propagated in the cell. The instantaneous intensity of each of the diffracted beams is determined, in part, by the instantaneous amplitude of the frequency component of the acoustic wave which is responsible for diffracting the beams at a particular diffraction angle. By sweeping each of two frequency components of the signal applied to transducer 62 through discrete frequency ranges $\Delta f$ and $\Delta f'$, the diffracted beams are swept through different angular ranges $\Delta\theta$ and $\Delta\theta'$. In order to produce tandem scan lines, the highest frequency of frequency range $\Delta f$ must correspond to the lowest frequency of frequency range $\Delta f'$. By independently varying the amplitude of each of two frequency components of the signal applied to transducer 65, the beams can be turned on and off to produce the desired pixel pattern in each column of the character matrix.

Upon being angularly deflected and modulated by the acoustooptic cell, beams B' and B" are focused by lens L1 to form an aerial image (at the entrance aperture of lens L2) of one vertical column of a character $A_k$. A stop S serves to remove the undiffracted beam B and lens L3 refocuses the diffracted beam upon the photoconductive layer 14 of the recording element. Lens L2 acts as a field lens to image the pupil of lens L1 at lens L3. It will be noted that the respective focal lengths of lenses L1 and L3 determine the vertical and horizontal scan magnifications.

Moving mirror M forms a part of a conventional mirror galvanometer 64 (e.g. a Model G300PD manufactured by General Scanning Corp.) which is driven by a relatively low frequency ramp or sawtooth signal through a galvanometer driver (e.g. a Model CCX-102 made by General Scanning Corp.). In response to such a signal, mirror M repetitively pivots about an axis Y' through a predetermined angle β, and thereby acts to deflect the diffracted beam B' through angle 2β, whereby the beam is scanned horizontally (i.e. in the direction of the X axis) across the width of the recording element. For each pivotal movement of mirror M, an entire line of characters is formed. While the rotational movement of the cylindrical recording element 10 may be incremental, with the increments being equal in length to the vertical stroke of the scanned beams and the incremental movement occurring during the flyback time of the mirror galvanometer 64, it is preferred to maintain continuous movement of the recording element. One may appreciate that this continuous movement will cause the line of characters to slant or skew relative to the axis of rotation. If the angle of skew is called q, one may compensate for the skew by tilting the mirror galvanometer so that its rotational axis Y' forms an angle −q with the vertical axis Y.

In order to use a single acoustooptic cell to both intensity-modulate and angularly-deflect the laser beam, it is important that the cell have a relatively wide bandwidth (e.g. 100 MHz). A cell which has been found particularly useful for this dual function is the Model D-150 Acoustooptic Deflector made by Zenith Corporation. Moreover, as indicated above, it is important that the diameter of the laser beam B be such that it facilitates both the modulation and deflection functions of the cell. The reason for this beam diameter requirement is explained in the application which is cross-referenced above.

Figure 4:
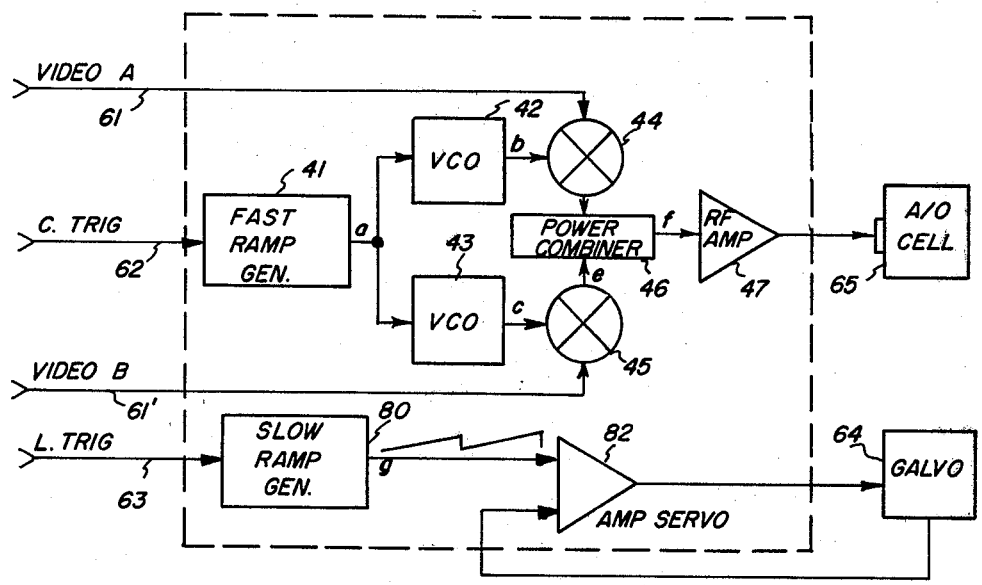
FIGS. 4 and 5 are block diagrams of circuitry comprising the scan generator and interface components of the FIG. 1 printer.

Scan generator 40, as best shown in FIG. 4, comprises circuitry for driving acoustooptic cell C and for controlling the pivotal position of the moving galvonometer mirror. The cell-driving circuitry basically comprises a conventional ramp generator 41, a pair of variable frequency oscillators 42 and 43, a pair of mixing circuits 44 and 45, and a power combiner 46. Ramp generator 41 is responsive to a gated trigger signal (C. TRIG) for producing a ramp signal which increases linearly from voltage $V_1$ to $V_2$. The trigger signal is provided by interface 60 (as described below) at a frequency equal to the frequency at which each pair of tandem scan lines is to be formed. Output a of ramp generator 41 is connected to the input terminals of oscillators 42 and 43 and is used to control the output frequency of each oscillator. Preferably, oscillators 42 and 43 are conventional voltage controlled oscillators, such as, for example, the Model 1002 manufactured by Wavetek Co. Oscillator 42 is tuned in such a manner that its output frequency b increases linearly in response to the ramp input, from a first frequency of, say, 100 MHz, to a second frequency of, say, 150 MHz. Similarly, VCO 43 is tuned so that its output frequency c increases, in response to its ramp input, from a first frequency of, say, 150 MHz, to a second frequency of, say, 200 MHz. It is important, as indicated above, that the frequency at which the output of VCO 42 ends its sweep substantially corresponds to the frequency at which the output of VCO 43 begins its sweep. The rate at which the VCO outputs are swept through their respective frequency ranges, commonly referred to as the tuning rate, is, of course, determined by the frequency of the ramp signal a. This frequency determines the rate at which each vertical column of pixels is formed. Preferably, the tuning rate is at least 5 MHz/microseconds which can provide a column time of about 10 microseconds.

Output b of VCO 42 is mixed, by means of a conventional mixing circuit 44, with a video signal A provided by the data source. Video signal A is a digital signal containing ½ of the pixel information (e.g. the upper half) of each column of an alphanumeric character. Thus, the mixed signal d provided by mixer 44 is an amplitude-modulated RF "chirp" which, during its duration, increases in frequency from 100 to 150 MHz. Similarly, output c of VCO 43 is mixed, by means of a second mixing circuit 45, with a second video signal B. This second video signal is a digital signal containing pixel information for the remaining half, e.g. the lower half, of each column of an alphanumeric character. Like signal d, output e of mixer 45 is an amplitude-modulated RF chirp having a frequency which, during the period of the chirp, increases from 150 MHz to 200 MHz. The respective outputs d and e of mixers 48 and 49 are combined in a power combiner 46, and the output f thereof is, upon being amplified by an RF amplifier 47, applied to the electromechanical transducer element of the acoustooptic cell.

As indicated above, the complex signal applied to the acoustooptic cell by the scan generator 40 acts to produce a complex acoustic vave in the cell having, at any time, two frequency components. As may be appreciated, the acoustic wave will have frequency componets of 100 and 150 MHz at the beginning of the ramp. While the ramp signal is applied to the VCO's the frequency components will increase, so that at the end of the ramp period, the frequency components will be 150 and 200 MHz. This has the effect, as indicated above, of producing two diffracted beams B' and B" which are scanned through two different angular ranges to produce, on the photosensitive recording element, tandem scan lines which together define one column of pixel information. Inasmuch as each column is produced at the same rate as each of the tandem scan lines is produced, the effect is to double the speed of the printer. It will be appreciated that the printing speed can be tripled or quadrupled by adding one or two more VCO's to the scan generator 40 and by mixing their respective outputs with video signals containing one-third or one-fourth of the information to be printed. It should be noted, however, that the intensity of each of the diffracted beams will be reduced by a factor equal to the number of VCO's employed.

Also shown in FIG. 4 as a part of a scan generator 40, is circuitry for driving the mirror galvanometer 64. As shown, a sawtooth waveform g provided by the "slow" ramp generator 80 is, upon being amplified by an operational amplifier 82, used to control the pivotal position of the galvanometer. Note, amplifier 82 also servos the mirror galvanometer to maintain a high degree of linearity. It will be noted that the frequency of the sawtooth produced by the ramp generator 80 is considerably less than that produced by the ramp generator 41, such frequency being that at which a full line of text is to be printed. The ratio of the sawtooth frequencies produced by generators 41 and 80 determine the spacing between successive vertical strokes of the laser beam. The beginning of each ramp of the sawtooth signal produced by generator 80 is initiated by a "line"

trigger (L.TRIG) signal 63 provided by interface 60. The video signals 61 and 61' are blanked during the galvanometer retrace.

Figure 5:
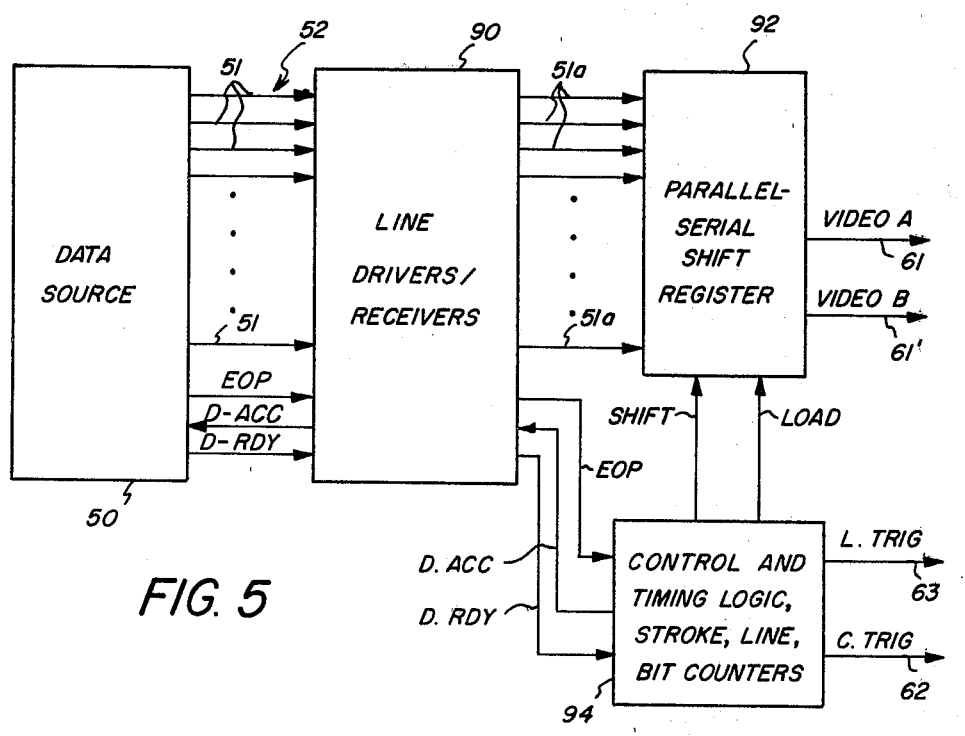

In FIG. 5, the system components used to produce the signals (i.e. signals 61, 61', 62 and 63) for controlling scan generator 40 are shown in block diagram form. Such components include a plurality of differential line driver/receiver circuits 90 for buffer amplifying the digital signals received on sixteen data lines from data source 50, and a parallel-serial shift register 92 for converting the buffered digital signals, received in parallel from the line driver/receiver circuits 90, to a pair of video signals 61 and 61' (video A and B), each comprising a continuous stream of pixel information. Three computer words (16 bits each) are collected from the data source in three sequential parallel data transfers; these words are then reformatted into two serial strings of 24 bits to make up a single vertical stroke (i.e. a column of 48 pixels). Video signals A and B, as mentioned above, are mixed with the chirped, swept frequency, RF signals provided by VCO's 42 and 43, and the resulting signals are combined to drive the cell's transducer 65. Appropriate blanking information (e.g. to prevent printing during column and line retrace) is also incorporated in the video signals.

In addition to converting the digital signals from data source 50 to a useful format, interface 60 supplies two gated timing signals, a column trigger (C.TRIG) signal 62 and a line trigger (L.TRIG) signal 63. The C.TRIG signal controls the timing and frequency of the sawtooth signal provided by ramp generator 41; thus, it determines the frequency at which successive vertical columns of pixels are formed. The L.TRIG signal controls the timing and frequency of the sawtooth signal provided by ramp generator 80; thus, it determines the frequency at which the galvanometer mirror pivots and, hence, the frequency at which horizontal scans occur.

The interface control circuitry (shown in FIG. 5) is timed with a crystal-controlled master system clock which comprises the logic and control component 94 of the interface. Shift register clocking, data transfer, and horizontal and vertical timing are all synchronous with this system clock. The logic and control component also includes a system of counters for counting data bits (pixels), vertical strokes and horizontal lines. The bit counter, upon counting a desired number (e.g. 24) of pixels per tandem scan line, produces a sync signal (i.e. the C.TRIG signal) to ramp generator 41. The stroke counter, upon counting a desired number of columns per line, produces a sync pulse (i.e. the L.TRIG signal) to the gated ramp generator 80. The stroke counter is programmable, thereby allowing a choice of galvanometer duty cycles to be employed.

Data is provided by the data source on a demand basis. A data-ready (D-RDY) flag indicates a page scan sequence may be started. Data-accepted flags (D-ACC) from the control circuitry cause new words to be shifted to the computer output. After an entire page of data has been clocked through the system, an end-of-page (EOP) flag from the data source shuts down and resets the entire circuit.

Data source 50 may comprise, for example, a general purpose minicomputer (e.g. the Model PDP-11 made by Digital Equipment Corp.), a large disc memory (e.g. the 80-megabyte disc memory made by Control Data Corp.) and a teletypewriter. The computer is programmed to receive the output of the teletypewriter in the form of a stream of ASCII (American Standard Code for Interchange of Information) characters, and to convert each of the ASCII characters to the 24 pixel/tandem scan line. The $A_k$ matrix of each input character is stored in the disc memory. Conversion from ASCII to the $A_k$ matrix is effected by a conventional table look-up approach, the $A_k$ font set being stored in the computer memory. On command from the control and timing logic element 94 of interface 60, the computer outputs the appropriate $A_k$ matrix on the 16 data lines 51 in a continuous stream of 16-bit words. Since there are 48 pixels per column, each column of information requires three separate transfers into the parallel-to-serial shift registers 92. The loading and shifting of data into and out of the shift registers is controlled by the control and timing logic 94 of the interface.

In operation, programs are written to accept ASCII code from an external information source (e.g. the teletype keyboard) and to create a page buffer in computer memory. This ASCII page buffer creation interfaces with the operator to the extent of limiting the number of characters per line, lines per page, and checking valid stored font characters. In the case of a teletype input, the page buffer is closed out and rendered ready for the actual font look-up program by typing an escape key followed by a carriage return key. The font look-up program accesses the page buffer by sequentially decoding each ASCII character until an escape key is decoded. Stored with the font table in the computer memory is a table of font widths for each character. This information is used for compiling and calculating the cumulative total number of pixels per line, etc., in the text creation program.

While the invention has been described with particular reference to a laser printer of the type which repetitively deflects a pair of laser beams in a first plane while the beams are simultaneously deflected, at a slower rate, in an orthogonal second plane to print an entire line of characters or the like, it should be apparent that the "tandem line" concept is not limited to this particular scanning technique. It could, for example, be used to form in a piecemeal fashion each of the horizontal lines of a conventional television-type raster. Furthermore, it should also be appreciated that, rather than using the same acoustooptic cell C to simultaneously modulate and deflect the diffracted beams B' and B", each beam could be separately modulated acoustooptically or otherwise before or after it has been angularly-deflected by the VCO-driven cell.

The invention has been disclosed in detail with particular reference to certain preferred embodiments thereof, but it will be understood that variations and modifications can be effected within the spirit and scope of the invention.

What is claimed is:

1. Laser printer apparatus with an improved resolution/speed characteristic for scan-imaging an information strip of relatively high transverse pixel density along a linear imaging zone, said apparatus comprising:

(a) means for producing at least two laser beams;

(b) means for simultaneously deflecting said laser beams respectively along adjacent, partial-width, linear regions of said linear imaging zone in both column-wise and row-wise directions so as to scan row-wise spaced sets of tandem, multi-pixel columns, one multi-pixel column of each such set being scanned by each of said beams; and (c) means for independently imagewise modulating the intensity of each of said laser beams during their simultaneous scans of respective partial-width regions.

2. The invention defined in claim 1 wherein said laser producing and deflecting means include:
(1) a laser for producing a continuous-wave beam of coherent, monochromatic radiation;
(2) an acoustooptic diffracting medium positioned in said continuous-wave beam; and
(3) first circuit means operatively coupled to said diffracting medium for activating said medium to: (i) produce at least two spatially separated, first order beams and (ii) repetitively and simultaneously deflect each of said first order beams, in column-wise directions through different angular ranges to effect respective multi-pixel column scans of a tandem set.

3. The apparatus as defined in claim 2, wherein said first circuit means comprises means for producing in said acoustooptic medium a complex acoustic wave having at least two discrete frequency components which respectively vary periodically through different frequency ranges, the uppermost frequency of one of said frequency ranges being substantially equal to the lowermost frequency of another of said frequency ranges.

4. The invention defined in claim 3 wherein said intensity modulating means includes second circuit means for separately controlling the amplitude of each of said frequency components in accordance with their respective portion of the image content of such information strip.

5. Laser printer apparatus with an improved resolution/speed characteristic for scan-imaging lines of alphanumeric characters along a linear imaging zone, said apparatus comprising:
(a) a laser for producing a beam of radiation;
(b) an acoustooptic medium positioned in said beam;
(c) piezoelectric transducer means acoustically coupled to said acoustooptic medium;
(d) a plurality of variable frequency osciallator means coupled to said transducer means for producing respectively within said medium a plurality of acoustic wave components that respectively diffract said beam into a corresponding plurality of spatially separated first-order beams;
(e) means operatively coupled to each of said oscillator means for periodically sweeping the frequency of respective oscillator means through different frequency ranges, whereby each of said first order beams is concurrently deflected through a different respective angular range to produce at said imaging zone a corresponding plurality of scan lines extending in tandem relation transversely across said imaging zone;
(f) means for concurrently deflecting said first order beams, during their transverse scans, in a direction substantially parallel to the length of said linear imaging zone; and
(g) means for simultaneously intensity modulating each of said first order beams independently in accordance with respective portions of the character to be imaged.

6. Laser printer apparatus having an improved resolution/speed characteristic for scan-imaging an information strip of relatively high transverse pixel density along a linear imaging zone, said apparatus comprising:
(a) a laser for producing a beam of coherent, monochromatic radiation;
(b) an acoustooptic cell positioned in the optical path of said laser beam;
(c) circuit means, operatively coupled to said cell and including piezoelectric transducer means, for activating said cell to: (1) produce a plurality of spatially separated first order beams and (2) repetitively and simultaneously deflect each of such first order beams transversely across said imaging zone through non-overlapping, contiguous ranges;
(d) means for concurrently scanning said diffracted beams in a direction parallel to the length of said imaging zone so as to produce row-wise spaced sets of tandem column scans along said imaging zone, each column scan of a tandem set being produced by different respective beams; and
(e) means for independently imagewise modulating the intensity of each of said diffracted beams during their concurrent column scans.

7. The apparatus as defined in claim 6 wherein said modulating means includes (1) means for receiving an input signal containing pixel information representative of a complete transverse column across said image zone, (2) means for separating said input signal into a number of multi-pixel segments corresponding to the number of spatially separated, first order beams, and (3) means for simultaneously imagewise modulating the intensity of each first order beam in accordance with its respective signal segment.

* * * * *